(12) United States Patent
Tanaka et al.

(10) Patent No.: US 10,391,578 B2
(45) Date of Patent: Aug. 27, 2019

(54) ARC WELDING CONTROL METHOD

(71) Applicant: DAIHEN CORPORATION, Osaka (JP)

(72) Inventors: Toshiyuki Tanaka, Osaka (JP); Toshiaki Nakamata, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 111 days.

(21) Appl. No.: 15/303,295

(22) PCT Filed: Apr. 27, 2015

(86) PCT No.: PCT/JP2015/062700
§ 371 (c)(1),
(2) Date: Oct. 11, 2016

(87) PCT Pub. No.: WO2015/178170
PCT Pub. Date: Nov. 26, 2015

(65) Prior Publication Data
US 2017/0028502 A1 Feb. 2, 2017

(30) Foreign Application Priority Data
May 19, 2014 (JP) .................. 2014-103477

(51) Int. Cl.
*B23K 9/12* (2006.01)
*B23K 9/073* (2006.01)
(Continued)

(52) U.S. Cl.
CPC .............. *B23K 9/125* (2013.01); *B23K 9/073* (2013.01); *B23K 9/09* (2013.01); *B23K 9/0956* (2013.01); *B23K 9/173* (2013.01)

(58) Field of Classification Search
CPC ........ B23K 9/073; B23K 9/09; B23K 9/0956; B23K 9/125; B23K 9/173; B23K 9/095; B23K 9/12
See application file for complete search history.

(56) References Cited

U.S. PATENT DOCUMENTS

2012/0111842 A1* 5/2012 Fujiwara .................. B23K 9/125
219/130.33
2012/0145691 A1* 6/2012 Fujiwara .................. B23K 9/073
219/130.31
(Continued)

FOREIGN PATENT DOCUMENTS

CN 1840277 10/2006
CN 101444868 6/2009
(Continued)

OTHER PUBLICATIONS

Translation JP2014030831.*
(Continued)

*Primary Examiner* — Ibrahime A Abraham
*Assistant Examiner* — Frederick F Calvetti
(74) *Attorney, Agent, or Firm* — Greenblum & Bernstein, P.L.C.

(57) ABSTRACT

There is provided an arc welding control method. As to a feeding rate of a welding wire, a forward feeding period and a reverse feeding period are alternated cyclically to generate short-circuiting periods and arc periods. When a constriction of a droplet formed at the welding wire is detected during the short-circuiting period, a welding current is reduced to shift to the arc period. Sensitivity of the detection of constriction is changed according to a waveform parameter of the feeding rate.

7 Claims, 4 Drawing Sheets

(51) Int. Cl.
  *B23K 9/09* (2006.01)
  *B23K 9/095* (2006.01)
  *B23K 9/173* (2006.01)

(56) References Cited

U.S. PATENT DOCUMENTS

| | | | | |
|---|---|---|---|---|
| 2012/0199560 | A1* | 8/2012 | Era | B23K 9/0731 |
| | | | | 219/74 |
| 2015/0028009 | A1 | 1/2015 | Ide | |
| 2015/0041449 | A1* | 2/2015 | Fujiwara | B23K 9/073 |
| | | | | 219/130.21 |
| 2015/0096965 | A1* | 4/2015 | Kawamoto | B23K 9/073 |
| | | | | 219/130.21 |
| 2015/0096966 | A1* | 4/2015 | Fujiwara | B23K 9/092 |
| | | | | 219/130.51 |
| 2016/0346864 | A1* | 12/2016 | Matsui | B23K 9/092 |
| 2017/0028502 | A1* | 2/2017 | Tanaka | B23K 9/073 |

FOREIGN PATENT DOCUMENTS

| | | |
|---|---|---|
| CN | 102361722 | 2/2012 |
| CN | 102380691 | 3/2012 |
| JP | 2006-281219 | 10/2006 |
| JP | 2011-098375 | 5/2011 |
| JP | 2012-240101 | 12/2012 |
| JP | 5201266 | 2/2013 |
| JP | 2014-030831 | 2/2014 |
| JP | 2014-039937 | 3/2014 |
| JP | 2015-20204 | 2/2015 |

OTHER PUBLICATIONS

Translation JP2014039937.*
Translation CN 102361722.*
International Search Report and Written Opinion issued in International Patent Application No. PCT/JP2015/062700, dated Aug. 4, 2015, together with an English language translation thereof.
China Office Action, issued in corresponding China Patent Application No. 201580009849.8, dated Jan. 2, 2018, together with an English language translation thereof.
Office Action in Japan Patent Application No. 2016-521015, dated Jan. 10, 2019, together with English language translation thereof.

* cited by examiner

ARC WELDING CONTROL METHOD

TECHNICAL FIELD

The present invention relates to an arc welding control method of alternating a forward feeding period and a reverse feeding period cyclically as to a feeding rate of a welding wire to generate short-circuiting periods and arc periods in a manner that shifting to the arc period is performed by reducing a welding current when a constriction of a droplet formed at the welding wire is detected during the short-circuiting period.

BACKGROUND ART

In a typical consumable electrode arc welding, welding is performed by feeding a welding wire as a consumable electrode at a constant feeding rate and generating an arc between the welding wire and base material. In the consumable electrode arc welding, both the welding wire and the base material are mostly placed in a welding state in which a short circuit state and an arc generation state are alternately repeated.

In order to further improve welding quality, there has been proposed a method of performing welding by alternating feeding of a welding wire between forward feeding and reverse feeding cyclically (see Patent Document 1, for example). Further there has been proposed a constriction detection control method in which a generation amount of a spatter is reduced by rapidly reducing a welding current in response to detection of a constriction of a droplet, as a precursory phenomenon of arc regeneration, and regenerating an arc in a small current-value state (see Patent Document 2, for example). Hereinafter these welding methods will be explained.

FIG. 4 is a waveform diagram of the welding method in which the forward feeding period and the reverse feeding period are alternated cyclically as to the feeding rate of the welding wire and also constriction detection control is performed. (A) of this figure shows a waveform of a feeding rate Fw, (B) of this figure shows a waveform of a welding current Iw and (C) of this figure shows a waveform of a welding voltage Vw, Hereinafter explanation will be made with reference to this figure.

As shown in (A) of this figure, in the feeding rate Fw, an upper side and a lower side than 0 represent a forward feeding period and a reverse feeding period, respectively. The forward feeding represents feeding of the welding wire in a direction approaching the base material, whilst the reverse feeding represents feeding of the welding wire in a direction separating from the base material. The feeding rate Fw has a waveform which changes sinusoid ally and shifts on the forward feeding side. Thus as an average value of the feeding rate Fw is positive, the welding wire is fed forwardly in average.

As shown in (A) of this figure, the feeding rate Fw is 0 at a time t1. A period from the time t1 to a time t2 corresponds to a forward feeding acceleration period. The feeding rate is the maximum value of the forward feeding at the time t2. A period from the time t2 to a time t3 corresponds to a forward feeding deceleration period. The feeding rate is 0 at the time t3. A period from the time t3 to a time t4 corresponds to a reverse feeding acceleration period. The feeding rate is the maximum value of the reverse feeding at the time t4. A period from the time t4 to a time t5 corresponds to a reverse feeding deceleration period. The feeding rate Fw changes repeatedly with a single cycle from the time t1 to the time t5.

Short circuit between the welding wire and the base material occurs mostly before or after the maximum value of the forward feeding at the time t2. This figure shows a case where the short circuit occurs at a time t21 during the forward feeding deceleration period after the maximum value of the forward feeding. If the short circuit occurs at the time t21, the welding voltage Vw reduces rapidly to a short-circuit voltage value of a few volts as shown in (C) of this figure, and the welding current Iw also reduces to an initial current value of a small current value as shown in (B) of this figure. Thereafter the welding current Iw increases with a predetermined inclination. When the welding current reaches a predetermined peak value, the welding current is maintained at this value.

As shown in (A) of this figure, from the time t3, as the feeding rate Fw is placed in the reverse feeding period, the welding wire is fed reversely. The short circuit is released by this reverse feeding, and an arc is regenerated at a time t31. The arc is regenerated mostly before or after the maximum value of the reverse feeding at the time t4. This figure shows a case where the arc is generated at the time t31 during the reverse feeding acceleration period before the maximum value of the reverse feeding.

If the arc is regenerated at the time t31, the welding voltage Vw increases rapidly to an arc voltage value of several tens of volts as shown in (C) of this figure. As shown in (B) of this figure, according to detection control of a constriction of a droplet as a precursory phenomenon of arc regeneration, the welding current Iw rapidly reduces from a time earlier than the time t31 by several hundreds of μs and becomes a small current value at the arc regeneration time t31. In this respect, if a constriction is formed at the droplet, as a current path becomes narrow, a resistance value or the welding voltage value between the welding wire and the base material increases. The constriction is detected by detecting this voltage increase.

As shown in (A) of this figure, from the time t31 to the time t5, the feeding rate Fw is placed in a reverse feeding state. An arc length becomes long during this period. As shown in (B) of this figure, during the period from the time t31 to the time 15, the welding current Iw increases with a predetermined inclination, then reaches a predetermined first welding current value and maintains this value until a predetermined period elapses after the arc regeneration (time t31). Thereafter a second welding current smaller than the first welding current flows until a time 61 at which the next short circuit occurs.

As shown in (A) of this figure, the feeding rate Fw is placed in the forward feeding period from the time t5 and reaches a forward feeding peak value at a time t6. Then the next short circuit occurs at a time t61. During a period from the time t5 to the time t61, the welding voltage Vw reduces gradually as shown in (C) of this figure, and the welding current Iw also reduces gradually as shown in (B) of this figure.

As described above, a cycle of the short circuit and the arc is substantially the same as a cycle of the forward feeding and the reverse feeding as to the feeding rate. That is, according to this welding method, the cycle of short circuit and arc can be set to a desired value by suitably setting the cycle of forward feeding and reverse feeding as to the feeding rate. Thus if this welding method is implemented, the cycle of short circuit and arc can be suppressed in its variance and made substantially constant. Consequently, in combination with the constriction detection control, the welding can be performed with a small generation amount of the spatter and with good bead appearance.

PRIOR ART DOCUMENT

Patent Document

Patent Document 1: Japanese Patent No. 5201266 B
Patent Document 2: Japanese Patent Application Publication No. 2006-281219A

SUMMARY OF INVENTION

Problems to Be Solved by Invention

According to the related techniques of the patent documents 1 and 2, the welding can be performed stably with a small generation amount of the spatter by cyclically alternating the forward feeding period and the reverse feeding period as to the feeding rate and performing the constriction detection control. In this case, it is necessary to change and optimize a waveform parameter (amplitude, cycle or the like) of the feeding rate depending on a welding condition such as a kind of the welding wire, an average welding current value, a welding speed and a joint shape. Further even if the welding condition is the same, the waveform parameter of feeding rate is sometimes changed according to a demand for setting the bead appearance to a desired shape, or a demand for adjusting feeling of an arc to worker's preference, for example.

If the waveform parameter of feeding rate changes, as a forming state of the droplet changes, a forming state of the constriction also changes. Thus if the waveform parameter of feeding rate changes, as the constriction detection control becomes unstable, the generation amount of spatter increases disadvantageously.

Accordingly an object of the present invention is to provide an arc welding control method which, in a welding method of cyclically alternating a forward feeding period and a reverse feeding period as to a feeding rate and performing constriction detection control, can suppress the constriction detection control becoming unstable when a waveform parameter of the feeding rate changes.

Means for Solving Problems

In order to solve the above-described problem, according to the present invention, there is provided an arc welding control method of alternating a forward feeding period and a reverse feeding period cyclically as to a feeding rate of a welding wire to generate short-circuiting periods and arc periods in a manner that shifting to the arc period is performed by reducing a welding current when a constriction of a droplet formed at the welding wire is detected during the short-circuiting period, the arc welding control method comprising: changing sensitivity of the detection of constriction according to a waveform parameter of the feeding rate.

According to the present invention, there is provided an arc welding control method of alternating a forward feeding period and a reverse feeding period cyclically as to a feeding rate of a welding wire to generate short-circuiting periods and arc periods in a manner that shifting to the arc period is performed by reducing a welding current when a constriction of a droplet formed at the welding wire is detected during the short-circuiting period, and sensitivity of the detection of constriction is subjected to automatic setting control based on a constriction detection time representing a time period from a time point where the constriction is detected during the short-circuiting period to a time point where shifting to the arc period is performed, the arc welding control method comprising: changing a gain for the automatic setting control according to a waveform parameter of the feeding rate.

According to the present invention, in the arc welding control method, the waveform parameter of feeding rate is at least one or more of an amplitude, a cycle and a ratio between the forward feeding period and the reverse feeding period.

Advantageous Effects of Invention

According to the present invention, if the waveform parameter of the feeding rate such as an amplitude, a cycle or a ratio between the forward feeding period and the reverse feeding period changes, as the detection sensitivity of constriction is automatically optimized, the constriction detection control can be suppressed becoming unstable.

EMBODIMENTS OF INVENTION

Hereinafter embodiments according to the present invention will be explained with reference to drawings.

First Embodiment

Figure 1:
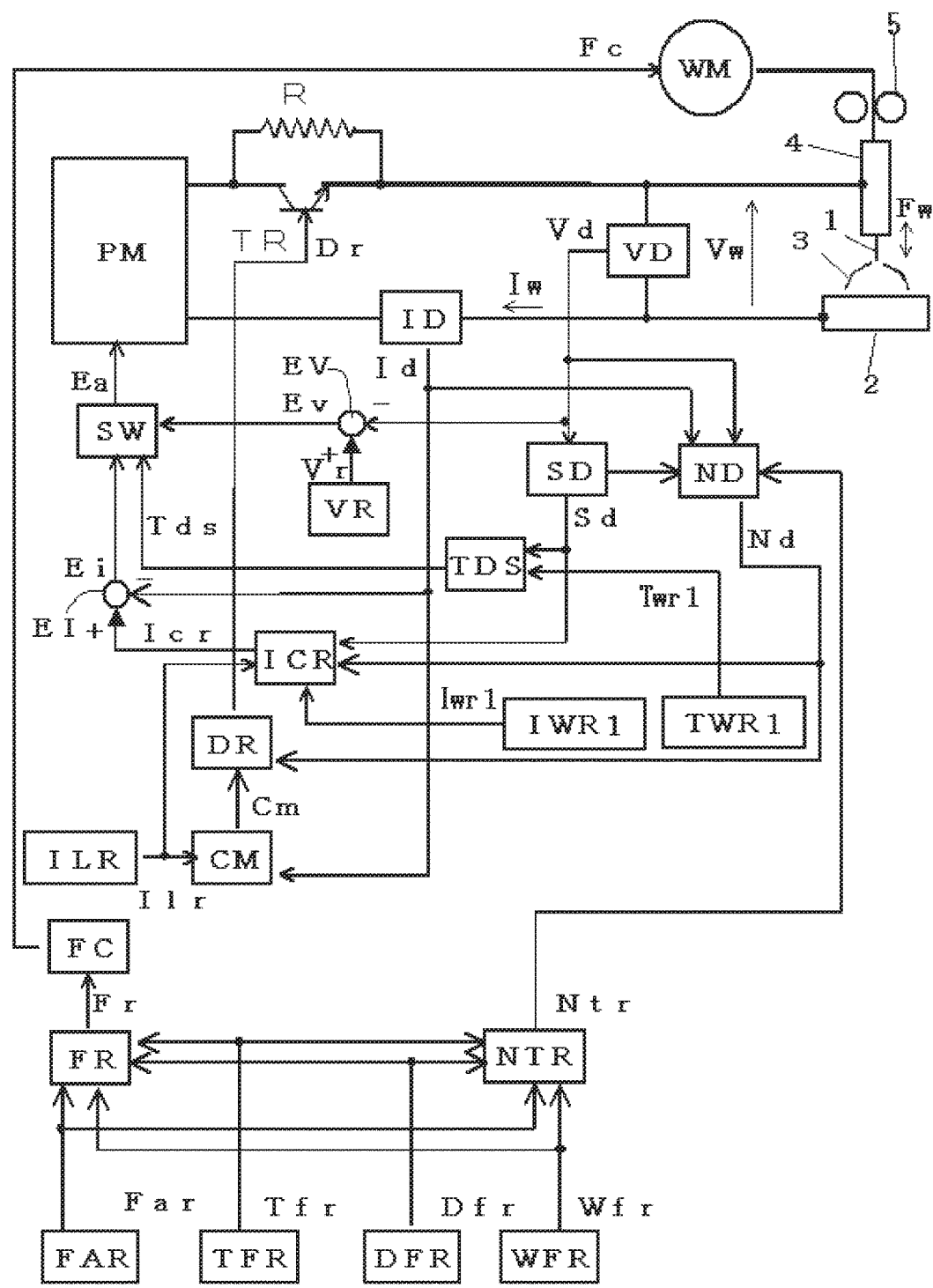
FIG. 1 A block diagram illustrating a welding power supply for implementing an arc welding control method according to a first embodiment of the present invention.

FIG. 1 is a block diagram illustrating a welding power supply for implementing an arc welding control method according to a first embodiment of the present invention. Hereinafter individual blocks will be explained with reference to this figure.

Using a power of three-phase 200V or the like from a commercial power supply (not shown) as input, a power supply main circuit PM subjects the input power to output control such as inverter control according to an error amplified signal Ea described later, and outputs a welding voltage Vw and a welding current Iw. Although not shown in the figure, this power supply main circuit PM includes a primary rectifier for rectifying the commercial power supply, a smoothing capacitor for smoothing the rectified DC, an inverter circuit for converting the smoothed DC into a high-frequency AC, a high-frequency transformer for stepping down the high-frequency AC to a voltage value suitable for welding, a secondary rectifier for rectifying the stepped-down high-frequency AC to a DC, a reactor for smoothing the rectified DC, a modulation circuit which performs a pulse width modulation control using the error amplified signal Ea as input, and an inverter driving circuit which drives switching elements of the inverter circuit using a pulse width modulation control signal as input.

A current decreasing resistor lit is inserted between the power supply main circuit PM and a welding torch 4. The current decreasing resistor R is set to a value (about 0.5 to 3Ω) ten times or more as large as that of a short-circuit load (about 0.01 to 0.03Ω). When the current decreasing resistor R is inserted into a current path, energy accumulated in a DC reactor within the welding power supply and a reactor of an external cable is rapidly discharged. A transistor TR is connected in parallel to the current decreasing resistor R and controlled so as to be turned on/off according to a drive signal Dr described later.

Using a feed control signal Fc described later as input, a feeding motor WM feeds a welding wire 1 at a feeding rate Fw in a manner of alternating forward feeding and reverse feeding cyclically. A motor having high transient responsiveness is used as the feeding motor WM. In some cases, the feeding motor WM is installed near a tip of the welding torch 4 in order to increase a change rate of the feeding rate Fw and an inversion speed of the feeding direction of the welding wire 1. Further in some cases, a push-pull feeding system is configured by using two feeding motors WM.

The welding wire 1 is fed within the welding torch 4 in accordance with rotation of a feeding roll 5 coupled to the feeding motor WM, and thus an arc 3 is generated between this wire and base material 2. The welding voltage Vw is applied between a power supply tip (not shown) within the welding torch 4 and the base material 2, and thus the welding current Iw flows.

A welding current detection circuit ID detects the welding current Iw and outputs a welding current detection signal Id. A welding voltage detection circuit VD detects the welding voltage Vw and outputs a welding voltage detection signal Vd.

Using the welding voltage detection signal Vd as input, a short-circuit discrimination circuit SD outputs a short-circuit discrimination signal Sd. In a case where a value of the welding voltage detection signal is less than a predetermined short-circuit/arc discrimination value (set to about 10V), the discrimination circuit determines to be a short-circuiting period and outputs the discrimination signal of a high level. In a case where a value of the welding voltage detection signal is the discrimination value or more, the discrimination circuit determines to be an arc period and outputs the discrimination signal of a low level.

An average feeding-rate setting circuit FAR outputs an average feeding-rate setting signal Far set in advance. An amplitude fine-adjustment circuit WFR outputs an amplitude fine-adjustment signal Wfr for finely adjusting an amplitude of the feeding rate. A cycle fine-adjustment circuit TFR outputs a cycle fine-adjustment signal Tfr for finely adjusting a cycle of the feeding rate. A forward/reverse ratio fine-adjustment circuit DFR outputs a forward/reverse ratio fine-adjustment signal Dfr for finely adjusting a ratio between the forward feeding period and the reverse feeding period of feeding rate (hereinafter referred to as forward/reverse ratio) D. The forward/reverse ratio D represents (reverse feeding period)/(forward feeding period).

Using the average feeding-rate setting signal Far, the amplitude fine-adjustment signal Wfr, the cycle fine-adjustment signal Tfr and the forward/reverse ratio fine-adjustment signal Dfr as input, a feeding-rate setting circuit FR outputs a feeding-rate setting signal Fr having a pattern formed by waveform parameters. In the waveform parameters, an amplitude standard value, a cycle standard value and a forward/reverse ratio standard value, each preset in correspondence to the average feeding-rate setting signal Far, are finely adjusted by individual values of the amplitude fine-adjustment signal Wfr, the cycle fine-adjustment signal Tfr and the forward/reverse ratio fine-adjustment signal Dfr, respectively. That is, using the average feeding-rate setting signal Far as input, the amplitude standard value is calculated according to a predetermined amplitude calculation function. Then an amplitude setting value is obtained by summing the amplitude standard value and the amplitude fine-adjustment signal Wfr. For example, the amplitude setting value is 80 m/min in a case where the amplitude standard value and Wfr are 90 m/min and −10 m/min, respectively. In the similar manner, the cycle setting value and the forward/reverse ratio setting value are calculated. Each of Wfr, Tfr and Dfr takes positive and negative values. Using the amplitude setting value, the cycle setting value and the forward/reverse ratio setting value thus calculated as the waveform parameters, the feeding-rate setting signal Fr alternating the forward feeding period and the reverse feeding period in a sinusoidal wave manner is outputted. Alternatively, the feeding-rate setting signal Fr may have a pattern of a trapezoidal wave, a triangular wave or the like.

Using the feeding-rate setting signal Fr as input, a feeding control circuit FC outputs, to the feeding motor WM, the feeding control signal Fc for feeding the welding wire 1 at the feeding rate Fw corresponding to the setting values of this setting signal.

A first welding current setting circuit IWR1 outputs a predetermined first welding current setting signal Iwr1. A first welding current conduction-period setting circuit TWR1 outputs a predetermined first welding current conduction-period setting signal Twr1.

Using the average feeding-rate setting signal Far, the amplitude fine-adjustment signal Wfr, the cycle fine-adjustment signal Tfr and the forward/reverse ratio fine-adjustment signal Dfr as input, a constriction detection-sensitivity setting circuit NTR calculates a constriction detection-sensitivity standard value Nts according to a predetermined constriction detection-sensitivity calculation function based on the average feeding-rate setting signal Far. Then the constriction detection-sensitivity setting circuit corrects the constriction detection-sensitivity standard value Nts using individual values of the amplitude fine-adjustment signal Wfr, the cycle fine-adjustment signal Tfr and the forward/reverse ratio fine-adjustment signal Dfr, and outputs the corrected value as a constriction detection-sensitivity setting signal Ntr. This correction is performed according to the following expression.

$$Ntr = Nts + a \cdot Wfr + b \cdot Tfr + c \cdot Dfr \quad (1)$$

where a, b and c are each an individual constant and positive real-number. These constants are calculated in advance by an experiment. The constriction detection-sensitivity standard value Nts is corrected to reduce the sensitivity when the amplitude fine-adjustment signal Wfr has a positive value, whilst corrected to increase the sensitivity when the signal has a negative value. Similarly, the constriction detection-sensitivity standard value Nts is corrected to reduce the sensitivity when the cycle fine-adjustment signal Tfr has a positive value, whilst corrected to increase the sensitivity when the signal has a negative value. Similarly, the constriction detection-sensitivity standard value Nts is corrected to reduce the sensitivity when the forward/ reverse ratio fine-adjustment signal Dfr has a positive value, whilst corrected to increase the sensitivity when the signal has a negative value.

Using the short-circuit discrimination signal Sd, the welding voltage detection signal Vd, the welding current detection signal Id and the constriction detection-sensitivity setting signal Ntr as input, a constriction detection circuit ND outputs a constriction detection signal Nd. When a voltage increasing value of the welding voltage detection signal Vd during the high level (short-circuiting period) of the short-circuit discrimination signal Sd reaches a value of the constriction detection-sensitivity setting signal Ntr, the constriction detection circuit determines that a forming state of the constriction becomes a reference state and outputs the constriction detection signal of a high level. The narrow-part detection circuit outputs the constriction detection signal of a low level when the short-circuit discrimination signal Sd changes to the low level (arc period). Alternatively the constriction detection signal Nd may be changed to the high level when a differential value of the welding voltage detection signal Vd in the short-circuiting period reaches a value of the constriction detection-sensitivity setting signal Ntr corresponding thereto. Further alternatively, a resistance value of a droplet may be calculated by dividing a value of the welding voltage detection signal Vd by a value of the welding current detection signal Id. Then the constriction detection signal Nd may be changed to the high level when a differential value of the resistance value reaches a value of the constriction detection-sensitivity setting signal Ntr corresponding thereto.

A low-level current setting circuit ILR outputs a predetermined low-level current setting signal Ilr. Using the low-level current setting signal Ilr and the welding current detection signal Id as input, a current comparison circuit CM outputs a current comparison signal Cm which becomes a high level in a case of Id<Ilr and a low level in a case of Id≥Ilr.

Using the current comparison signal Cm and the constriction detection signal Nd as input, a driving circuit DR outputs, to a base terminal of the transistor TR, the drive signal Dr which changes to a low level when the constriction detection signal Nd changes to the high level, and thereafter changes to a high level when the current comparison signal Cm changes to the high level. In this manner, the drive signal Dr changes to the low level when the constriction is detected, thereby placing the transistor TR in the off state. Thus as the current decreasing resistor R is inserted into the current path, the welding current Iw flowing in the short-circuit load reduces rapidly. Then when the welding current Iw thus rapidly reduced reduces to the value of the low-level current setting signal Ilr, the drive signal Dr changes to the high level, thereby placing the transistor TR in the on state. Thus as the current decreasing resistor R is short-circuited, a normal state is restored.

Using the short-circuit discrimination signal Sd, the low-level current setting signal Ilr, the constriction detection signal Nd and the first welding current setting signal Iwr1 as input, a current control setting circuit ICR performs the following processing and outputs a current control setting signal Icr. 1) During a predetermined initial period from a time where the short-circuit discrimination signal Sd changes to the high level (short circuit), outputting a predetermined initial current setting value as the current control setting signal Icr. 2) Thereafter increasing a value of the current control setting signal Icr from the initial current setting value to a predetermined peak setting value with a predetermined inclination upon short circuit, and maintaining the peak setting value. 3) When the constriction detection signal Nd changes to the high level, changing a value of the current control setting signal Icr to the value of the low-level current setting signal Ilr and maintaining this value. 4) When the short-circuit discrimination signal Sd changes to the low level (arc), increasing the current control setting signal Icr to a value of the first welding current setting signal Iwr1 with a predetermined inclination upon arc and maintaining this value.

Using the short-circuit discrimination signal Sd and the first welding current conduction-period setting signal Twr1 as input, an off-delay circuit TDS outputs a delay signal Tds which is obtained by off-delaying a changing timing of the short-circuit discrimination signal Sd from the high level to the low level by a period of the first welding current conduction-period setting signal Twr1. Thus this delay signal Tds changes to a high level in response to the start of the short-circuiting period and changes to a low level by being off-delayed by the period of the first welding current conduction-period setting signal Twr1 after regeneration of an arc.

A current error amplifying circuit EI amplifies an error between the current control setting signal Icr (+) and the welding current detection signal Id (−) and outputs a current error amplified signal Ei.

A voltage setting circuit VR outputs a predetermined voltage setting signal Vr for setting the welding voltage during the arc period. A voltage error amplifying circuit EV amplifies an error between the voltage setting signal Vr (+) and the welding voltage detection signal Vd (−) and outputs a voltage error amplified signal Ev.

Using the current error amplified signal Ei, the voltage error amplified signal Ev and the delay signal Tds as input, a control switching circuit SW outputs the error amplified signal Ea. That is, the control switching circuit outputs the current error amplified signal Ei as the error amplified signal in a case where the delay signal Tds is at the high level (a period from the start of short circuit to a time elapsing the period of the first welding current conduction-period setting signal Twr1 after the regeneration of arc), whilst outputs the voltage error amplified signal Ev as the error amplified signal Ea in a case where the delay signal Tds is at the low level (arc). According to this circuit, constant current control is performed during both the short-circuiting period and the first welding-current conduction period, whilst constant voltage control is performed during the arc period other than these periods.

Figure 2:
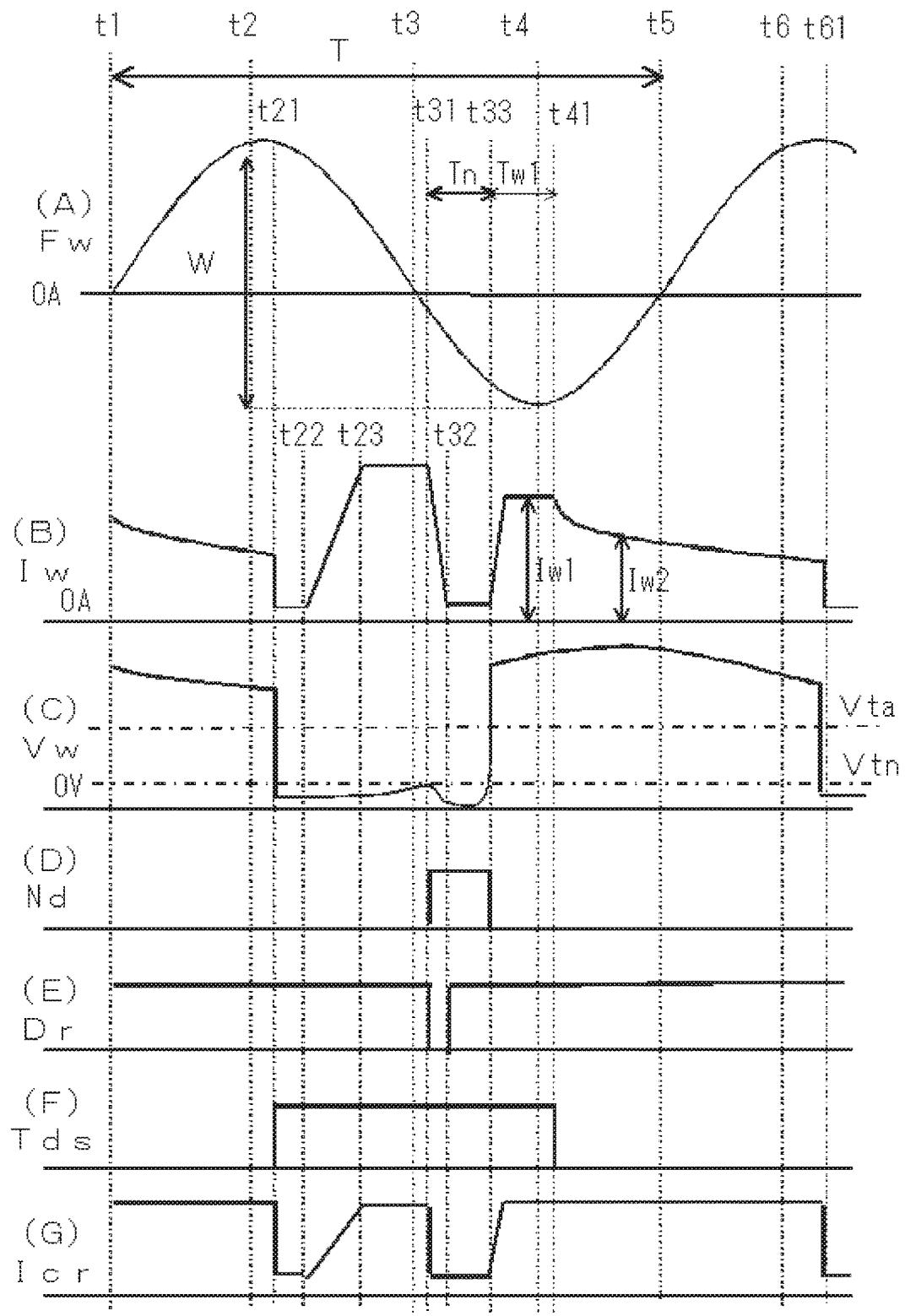
FIG. 2 A timing chart illustrating individual signals in the welding power supply of FIG. 1, for explaining the arc welding control method according to the first embodiment of the present invention.

FIG. 2 is a timing chart illustrating individual signals in the welding power supply of FIG. 1, for explaining the arc welding control method according to the first embodiment of the present invention. (A) of this figure shows temporal change of the feeding rate Fw of the welding wire 1, (B) of this figure shows temporal change of the welding current Iw, (C) of this figure shows temporal change of the welding voltage Vw, (D) of this figure shows temporal change of the constriction detection signal Nd, (E) of this figure shows temporal change of the drive signal Dr, (F) of this figure shows temporal change of the delay signal Tds, and (G) of this figure shows temporal change of the current control setting signal Icr, Hereinafter explanation will be made with reference to this figure.

As shown in (A) of this figure, in the feeding rate Fw, positive values on an upper side than 0 represent that the welding wire is fed forwardly, and negative values on a lower side than 0 represent that the welding wire is fed reversely. As the feeding rate Fw shown in (A) of this figure is set by the feeding-rate setting signal Fr (not shown), the feeding rate has a waveform similar to that of the feeding-rate setting signal. As described above with reference to FIG. 1, the feeding-rate setting signal Fr has the sinusoidal pattern formed by the waveform parameters in which the amplitude standard value, the cycle standard value and the forward/reverse ratio standard value each preset in correspondence to the average feeding-rate setting signal Far are finely adjusted by individual values of the amplitude fine-adjustment signal Wfr, the cycle fine-adjustment signal Tfr and the forward/reverse ratio fine-adjustment signal Dfr, respectively. Although the feeding-rate setting signal changes sinusoidally in this figure, this signal may change in a form of a triangular wave or a trapezoidal wave.

As shown in (A) of this figure, the feeding rate Fw is 0 at a time t1. A period from the time t1 to a time t2 corresponds to a forward feeding acceleration period. The feeding rate is the maximum value of the forward feeding at the time t2. A period from the time t2 to a time t3 corresponds to a forward feeding deceleration period. The feeding rate is 0 at the time t3. A period from the time t3 to a time t4 corresponds to a reverse feeding acceleration period. The feeding rate is the maximum value of the reverse feeding at the time t4. A period from the time t4 to a time t5 corresponds to a reverse feeding deceleration period. In this manner, the feeding rate Fw has a waveform repeating a period from the time t1 to the time t5 as a single cycle T. An amplitude W represents a difference between the maximum value of forward feeding and the maximum value of reverse feeding. A forward/reverse ratio D represents (period from t3 to t5)/(period from t1 to t3). For example, the forward feeding period from the time t1 to the time t3 is 5.4 ms, the reverse feeding period from the time t3 to the time t5 is 4.6 ms. In this case, the single cycle T is 10 ms and the forward/reverse ratio D is 0.85. Further, the maximum value of the forward feeding is 50 m/min and the maximum value of the reverse feeding is −40 m/min. In this case, the amplitude W is 90 m/min. An average value of the feeding rate is about +4 m/min and an average value of the welding current is about 150 A.

If the short circuit occurs between the welding wire and the base material at a time t21, the welding voltage Vw reduces rapidly to a short-circuit voltage value of a few volts as shown in (C) of this figure. When the short circuit occurs at the time t21 and discrimination is made that the welding voltage Vw reduces smaller than a short-circuit/arc discrimination value Vta, the delay signal Tds changes to the high level from the low level as shown in (F) of this figure. In response to this, as shown in (G) of this figure, the current control setting signal Icr changes to the predetermined initial current setting value of a small value at the time t21.

Then as the reverse feeding acceleration period starts from the time t3, the feeding rate Fw is switched to the reverse feeding direction. As shown in (G) of this figure, the current control setting signal Icr is the initial current setting value during the predetermined initial period from the time t21 to a time t22, then increases with the predetermined inclination upon short circuit during a period from the time t22 to a time t23, and is the predetermined peak setting value during a period from the time t23 to a time t31. As described above, as the constant current control is performed during the short-circuiting period, the welding current Iw is controlled to individual values corresponding to the current control setting signal Icr. Thus as shown in (B) of this figure, the welding current Iw rapidly reduces at the time t21 from the welding current during the arc period, is an initial current value during the initial period from the time t21 to the time t22, increases with an inclination upon short circuit during the period from the time t22 to the time t23, and is a peak value during the period from the time t23 to the time t31. For example, the initial period is set to 1 ms, the initial current is set to 50 A, the inclination upon short circuit is set to 400 A/ms and the peak value is set to 450 A. As shown in (D) of this figure, the constriction detection signal Nd is the high level during a period from the time t31 to a time t33 described later and is the low level during a period other than this period. As shown in (E) of this figure, the drive signal Dr is the low level during a period from the time t31 to a time t32 described later and is the high level during a period other than this period. Accordingly, during the period before the time t31 in this figure, as the drive signal Dr is the high level, the transistor TR of FIG. 1 is placed in the on state. Thus as the current decreasing resistor R is short-circuited, the welding power supply is placed in the same state as a normal consumable electrode type arc welding power supply.

As shown in (C) of this figure, the welding voltage Vw increases almost from the time t23 at which the welding current Iw reaches the peak value. This is because a constriction is gradually formed at a droplet due to the reverse feeding of the welding wire and a pinch force of the welding current Iw.

When the voltage increasing value of the welding voltage Vw during the short-circuiting period reaches a value of the constriction detection-sensitivity setting signal Ntr at the time t31 determination is made that the forming state of constriction becomes the reference state and the constriction detection signal Nd changes to the high level as shown in (D) of this figure. The constriction detection signal Nd changes to the high level upon the detection of constriction at the time t31 and changes to the low level upon regeneration of an arc at the time t33. A period during which the constriction detection signal Nd is at the high level is called as a constriction detection time Tn. Using the average feeding-rate setting signal Far as input, the constriction detection-sensitivity setting circuit NTR of FIG. 1 calculates the constriction detection-sensitivity standard value Nts according to the predetermined constriction detection-sensitivity calculation function. Then the constriction detection-sensitivity setting circuit corrects the constriction detection-sensitivity standard value Nts using the individual values of the amplitude fine-adjustment signal Wfr, the cycle fine-adjustment signal Tfr and the forward/reverse ratio fine-adjustment signal Dfr. The constriction detection-sensitivity setting signal Ntr is set to this corrected value. That is, the constriction detection-sensitivity setting signal Ntr is calculated according to the expression (1), so that this signal is automatically set to a value adapted to the waveform parameter of the feeding rate Fw. Thus when the waveform parameter of the feeding rate changes, constriction detection control can be suppressed becoming unstable.

In response to that the constriction detection signal Nd changes to the high level at the time t31, as shown in (E) of this figure, as the drive signal Dr becomes the low level, the transistor TR of FIG. 1 is placed in the off state and hence the current decreasing resistor R is inserted into the current path. Simultaneously as shown in (G) of this figure, the current control setting signal Icr reduces to the value of the low-level current setting signal Ilr. Thus as shown in (B) of this figure, the welding current Iw rapidly reduces to a low-level current value Il from the peak value. Then, when the welding current Iw reduces to the low-level current value Il at the time t32, the drive signal Dr is restored to the high level as shown in (E) of this figure. Thus the transistor TR of FIG. 1 is placed in the on state and hence the current decreasing resistor R is short-circuited. As shown in (B) of this figure, as the current control setting signal Icr is maintained to the value of the low-level current setting signal Ilr, the welding current Iw maintains the low-level current value Il until an arc is regenerated at the time t33. Accordingly the transistor TR is placed in the off state only during the period from the time t31 at which the constriction detection signal Nd changes to the high level to the time t32 at which the welding current Iw reduces to the low-level current value Il. As shown in (C) of this figure, as the welding current Iw becomes small, the welding voltage Vw once reduces from the time t31 and thereafter increases rapidly. The low-level current value Il is set to, for example, 50 A.

If the constriction is promoted due to the reverse feeding of the welding wire and the pinch force of the flowing of the welding current Iw and then the arc is regenerated at the time t33, a value of the welding voltage Vw becomes the short-circuit/arc discrimination value Vta or more as shown in (C) of this figure.

As the reverse feeding deceleration period starts from the time t4 immediately after the regeneration of arc, the feeding rate Fw reduces while maintaining the reverse feeding state, as shown in (A) of this figure. When the arc is regenerated at the time t33, as shown in (G) of this figure, a value of the current control setting signal Icr increases with the predetermined inclination upon arc from the value of the low-level current setting signal Ilr, then reaches the value of the predetermined first welding current setting signal Iwr1 and thereafter maintains this value. As shown in (F) of this figure, the delay signal Tds maintains the high level until a time t41 at which the period of the predetermined first welding current conduction-period setting signal Twr1 elapses after the regeneration of the arc at the time t33. Thus as the welding power supply is subjected to the constant current control until the time t41, as shown in (B) of this figure, the welding current Iw increases with an inclination upon arc from the time t33, then reaches the value of the first welding current setting signal Iwr1 and maintains this value until the time t41. As shown in (C) of this figure, the welding voltage Vw is in a first welding-voltage value state of a large value during a first welding-current conduction period Tw1 from the time t33 to the time t41. As shown in (D) of this figure, the constriction detection signal Nd changes to the low level at the time t33 due to the regeneration of the arc. For example, the inclination upon arc is set to 400 A/ms, the first welding current setting signal Iwr1 is set to 450 A and the first welding current conduction-period setting signal Twr1 is set to 2 ms.

As shown in (F) of this figure, the delay signal Tds changes to the low level at the time t41. As a result, the welding power supply is switched to the constant voltage control from the constant current control. Until the time t5 from the time t33 at which the arc is regenerated, as the welding wire is reversely fed, the arc length becomes longer gradually. As the forward feeding acceleration period starts from the time t5, the feeding rate Fw is switched to the forward feeding as shown in (A) of this figure. When the welding power supply is switched to the constant voltage control at the time t41, as shown in (B) of this figure, a second welding current Iw2 gradually reducing from a first welding current Iw1 flows as the welding current Iw. Similarly, the welding voltage Vw gradually reduces from the first welding voltage value as shown in (C) of this figure. The next short circuit occurs at a time t61 after the maximum value of the forward feeding at a time t6.

According to the first embodiment, the detection sensitivity of constriction is changed according to the waveform parameter of feeding rate. As a result, if the waveform parameter of the feeding rate such as an amplitude, a cycle or a ratio between the forward feeding period and the reverse feeding period changes, as the detection sensitivity of constriction is automatically optimized, the constriction detection control can be suppressed becoming unstable. According to the present invention, if the waveform parameter of the feeding rate such as an amplitude, a cycle or a ratio between the forward feeding period and the reverse feeding period changes, as the detection sensitivity of constriction is automatically optimized, the constriction detection control can be suppressed becoming unstable.

Second Embodiment

Figure 3:
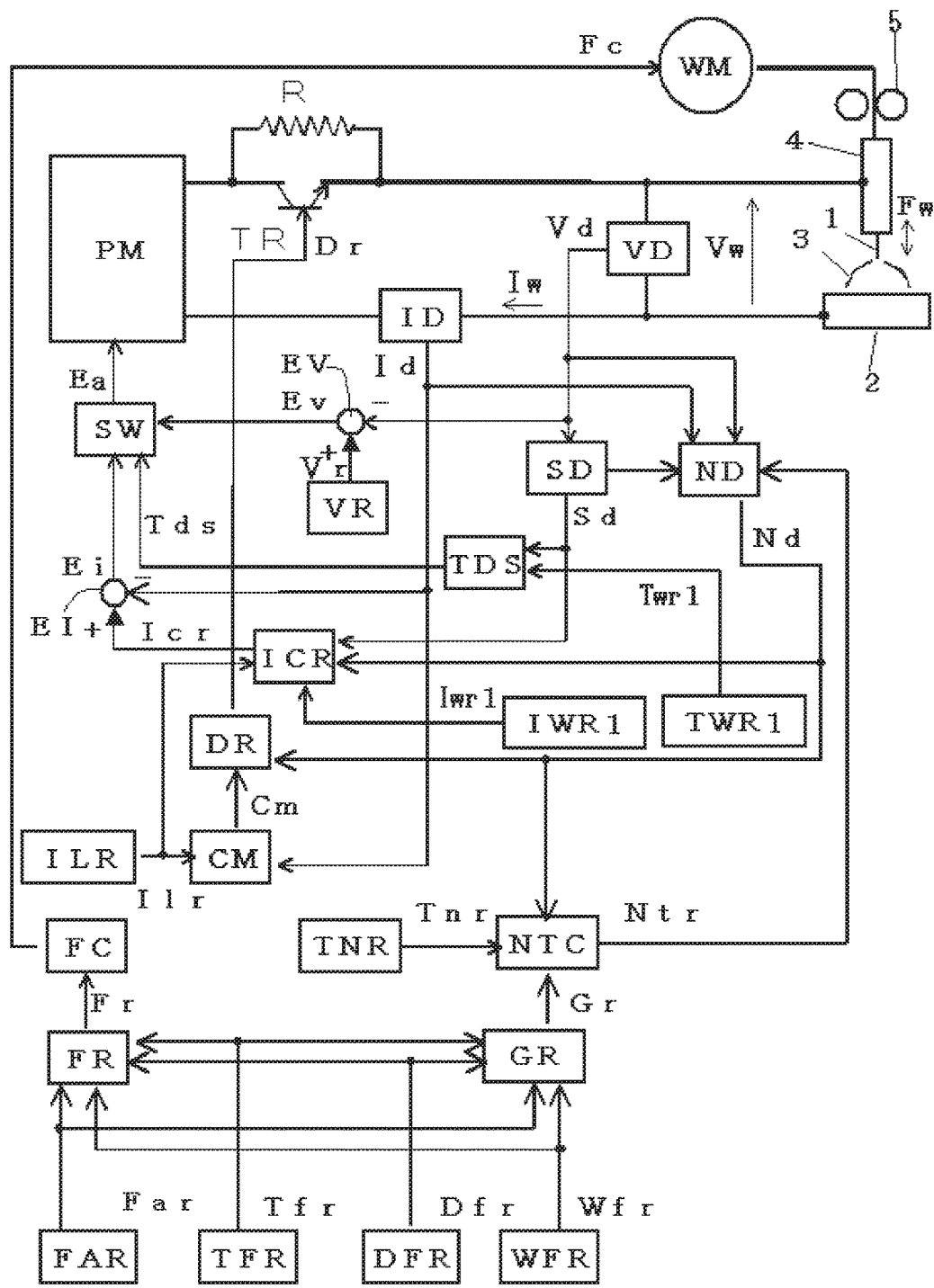
FIG. 3 A block diagram illustrating a welding power supply for implementing an arc welding control method according to a second embodiment of the present invention.
Figure 4:
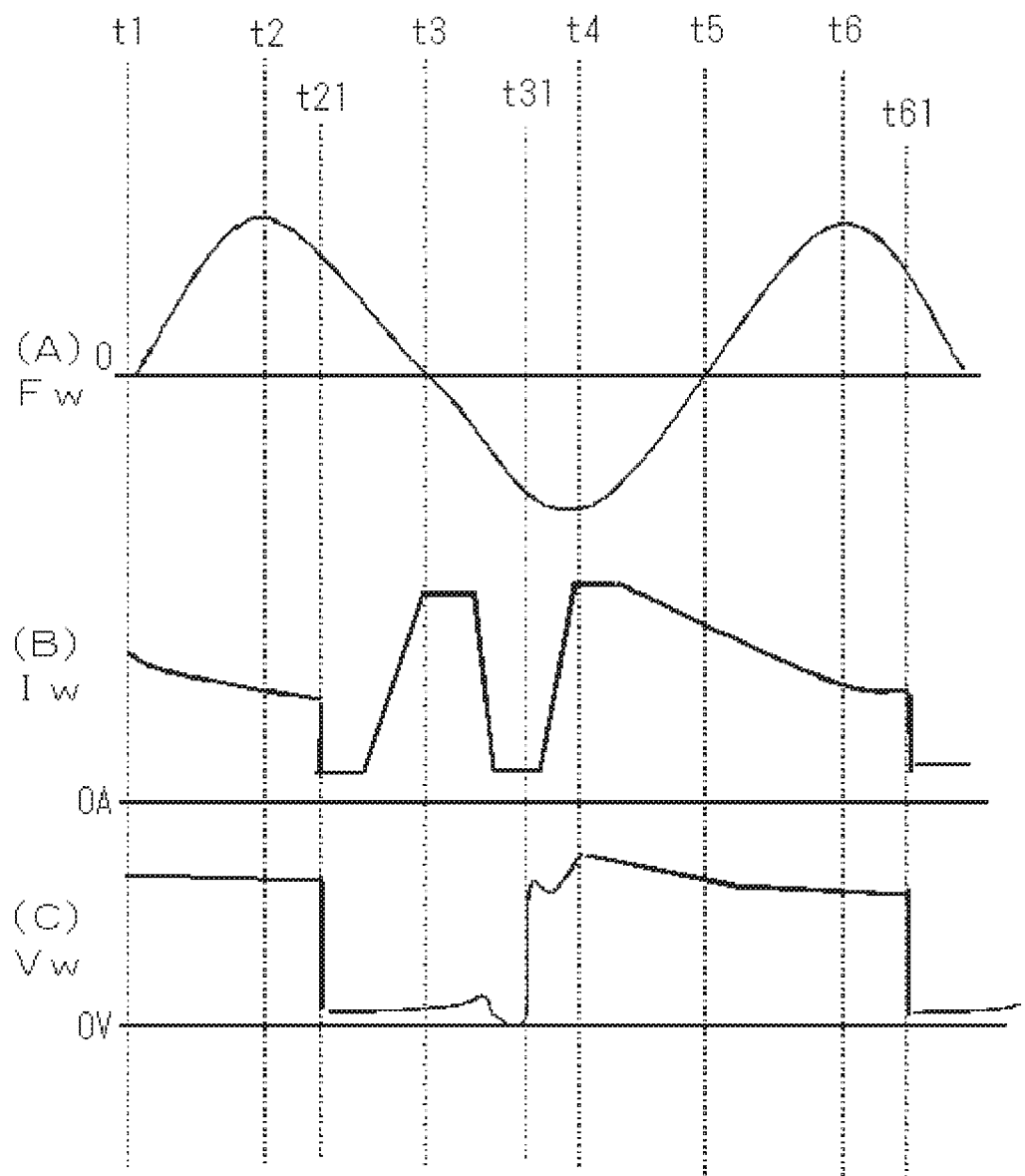
FIG. 4 A waveform diagram of a welding method of a related art in which a forward feeding period and a reverse feeding period are alternated cyclically as to a feeding rate of a welding wire and a constriction detection control is performed.

According to a second embodiment of the present invention, the detection sensitivity of constriction is subjected to automatic setting control based on a constriction detection time representing a time period from a time point where a constriction is detected during the short-circuiting period to a time point where shifting to the arc period is performed, and a gain for the automatic setting control is changed according to the waveform parameter of feeding rate FIG. 3 is a block diagram illustrating a welding power supply for implementing an arc welding control method according to the second embodiment of the present invention. This figure corresponds to FIG. 1, and blocks identical to those of FIG. 1 are referred to by the same symbols, with explanation thereof being omitted. In this figure, a constriction detection-time setting circuit TNR is added to FIG. 1, the constriction detection-sensitivity setting circuit NTR of FIG. 1 is replaced by a gain setting circuit GR, and a constriction detection-sensitivity automatic setting control circuit NTC is added to FIG. 1. Hereinafter these individual blocks will be explained with reference to this figure.

The constriction detection-time setting circuit TNR outputs a predetermined constriction detection-time setting signal Tnr. When the constriction detection-sensitivity setting signal Ntr has a proper value and the constriction detection control is stable, the constriction detection time Tn is a proper value within a range from 200 to 1,000 µs. Thus the constriction detection-time setting signal Tnr is set to 500 µs, for example.

Using the average feeding-rate setting signal Far, the amplitude fine-adjustment signal Wfr, the cycle fine-adjustment signal Tfr and the forward/reverse ratio fine-adjustment signal Dfr as input, the gain setting circuit GR calculates a gain standard value Gs according to a predetermined gain calculation function based on the average feeding-rate setting signal Far. Then the gain setting circuit corrects the gain standard value Gs using individual values of the amplitude fine-adjustment signal Wfr, the cycle fine-adjustment signal Tfr and the forward/reverse ratio fine-adjustment signal Dfr, and outputs the corrected value as a gain setting signal Gr. This correction is performed according to the following expression.

$$Gr = Gs + a2 \cdot Wfr + b2 \cdot Tfr + c2 \cdot Dfr \quad (2)$$

where a2, b2 and c2 are each an individual constant and negative real-number. These constants are calculated in advance by an experiment. The gain standard value Gs is corrected to reduce the gain when the amplitude fine-adjustment signal Wfr has a positive value, whilst corrected to increase the gain when this signal has a negative value. Similarly, the gain standard value Gs is corrected to reduce the gain when the cycle fine-adjustment signal Tfr has a positive value, whilst corrected to increase the gain when this signal has a negative value. Similarly, the gain standard value Gs is corrected to reduce the gain when the forward/reverse ratio fine-adjustment signal Dfr has a positive value, whilst corrected to increase the gain when this signal has a negative value.

Using the gain setting signal Gr, the constriction detection-time setting signal Tnr and the constriction detection signal Nd as input, the constriction detection-sensitivity automatic setting control circuit NTC calculates a time period during which the constriction detection signal Nd is at the high level to detect the constriction detection time Tn, each time the constriction detection signal Nd changes to the low level (arc regeneration). Then this circuit amplifies an error between the constriction detection time Tn and a value of the constriction detection-time setting signal Tnr with a gain determined by the gain setting signal Gr to obtain an error amplified value Et, and accumulates the error amplified values to obtain and output the constriction detection-sensitivity setting signal Ntr=Nt0+ΣEt. Nt0 is a predetermined initial value. According to this circuit, a value of the constriction detection-sensitivity setting signal Ntr is controlled so as to be automatically set to a suitable value so that the constriction detection time Tn becomes equal to a value of the constriction detection-time setting signal Tnr. When the waveform parameter of feeding rate Fw changes, as the gain setting signal Gr is optimized, the automatic setting control can be stabilized. Consequently when the waveform parameter of feeding rate Fw changes, the constriction detection control can be suppressed becoming unstable.

A timing chart of individual signals in the welding power supply of FIG. 3 for explaining the arc welding control method according to the second embodiment of the present invention is same as that of FIG. 2, and hence the explanation thereof is omitted. However the timing chart in this embodiment differs from FIG. 2 in a point that a value of the constriction detection-sensitivity setting signal Ntr, for determining a timing at which the constriction detection signal Nd shown in (D) of FIG. 2 becomes the high level, is controlled so as to be automatically set to a suitable value. Further the timing chart in this embodiment differs from FIG. 2 in a point that a value of the gain setting signal Gr for the automatic setting control changes to a suitable value according to the change of the waveform parameter of feeding rate Fw so that stability of the control system is maintained even if the waveform parameter of feeding rate Fw changes.

According to the second embodiment described above, the detection sensitivity of constriction is subjected to the automatic setting control based on the constriction detection time representing the time period from the time point where a constriction is detected during the short-circuiting period to the time point where shifting to the arc period is performed, and a gain for the automatic setting control is changed according to the waveform parameter of feeding rate Thus according to this embodiment, if the waveform parameter of feeding rate such as an amplitude, a cycle or a ratio between the forward feeding period and the reverse feeding period changes, a gain for subjecting the detection sensitivity of constriction to the automatic setting control is optimized. Consequently even if the waveform parameter of feeding rate changes, as the detection sensitivity of constriction is optimized, the constriction detection control can be suppressed becoming unstable.

INDUSTRIAL APPLICABILITY

According to the present invention, if the waveform parameter of feeding rate such as an amplitude, a cycle or a ratio between the forward feeding period and the reverse feeding period changes, as the detection sensitivity of constriction is automatically optimized, the constriction detection control can be suppressed becoming unstable.

Although the present invention is explained with reference to the particular embodiments, the present invention is not limited thereto but the embodiments may be changed in various manners within a range not departing from the technical concept disclosed in the present invention.

This application is based on Japanese Patent Application (Japanese Patent Application No. 2014-103477) filed on May 19, 2014, the content of which is incorporated herein by reference.

DESCRIPTION OF REFERENCE NUMERALS 1 welding wire
2 base material
3 arc
4 welding torch
5 feeding roll
CM current comparison circuit
Cm current comparison signal
D forward/reverse ratio
DFR forward/reverse ratio fine-adjustment circuit
Dfr forward/reverse ratio fine-adjustment signal
DR driving circuit
Dr drive signal
Ea error amplified signal
EI current error amplifying circuit
Ei current error amplified signal
Et error amplified value
EV voltage error amplifying circuit
Ev voltage error amplified signal
FAR average feeding-rate setting circuit
Far average feeding-rate setting signal
FC feeding control circuit
Fc feeding control signal
FR feeding-rate setting circuit
Fr feeding-rate setting signal
Fw feeding rate
GR gain setting circuit
Gr gain setting signal
Gs gain standard value
ICR current control setting circuit
Icr current control setting signal
ID welding current detection circuit
Id welding current detection signal
Il low-level current value
ILR low-level current setting circuit
Ilr low-level current setting signal
Iw welding current
Iw1 first welding current
Iw2 second welding current
IWR1 first welding current setting circuit
Iwr1 first welding current setting signal
ND constriction detection circuit
Nd constriction detection signal
NTC constriction detection-sensitivity automatic setting control circuit
NTR constriction detection-sensitivity setting circuit
Ntr constriction detection-sensitivity setting signal
Nts constriction detection-sensitivity standard value
PM power supply main circuit
R current decreasing resistor
SD short-circuit discrimination circuit
Sd short-circuit discrimination signal SW control switching circuit
T cycle
TDS off-delay circuit
Tds delay signal
TFR cycle fine-adjustment circuit
Tfr cycle fine-adjustment signal
Tn constriction detection time
TNR constriction detection-time setting circuit
Tnr constriction detection-time setting signal
TR transistor
Tw1 first welding-current conduction period
TWR1 first welding current conduction-period setting circuit
Twr1 first welding current conduction-period setting signal
VD welding voltage detection circuit
Vd welding voltage detection signal
VR voltage setting circuit
Vr voltage setting signal
Vta short-circuit/arc discrimination value
Vw welding voltage
W amplitude
WFR amplitude fine-adjustment circuit
Wfr amplitude fine-adjustment signal
WM feeding motor

The invention claimed is:

1. An arc welding control method comprising:
cyclically alternating a forward feeding period and a reverse feeding period as to a feeding rate of a welding wire, to generate short-circuiting periods and arc periods;
performing shifting to the arc period by reducing a welding current, in response to a detection of a constriction of a droplet formed on the welding wire during the short-circuiting period,
changing sensitivity of the detection of constriction according to a waveform parameter of the feeding rate,
wherein the constriction of the droplet is detected when one of a voltage increasing value and a voltage differential value of a welding voltage reaches a voltage threshold,
the sensitivity is defined by the voltage threshold and is changed by changing the voltage threshold,
wherein the waveform parameter of feeding rate is at least one or more of an amplitude, a cycle and a forward/reverse ratio, which is a ratio between the forward feeding period and the reverse feeding period of a waveform of the feeding rate,
wherein the feeding rate of the welding wire is controlled by controlling a feeding motor based on a control signal generated by adjusting a predetermined average feeding-rate setting signal with an amplitude fine-adjustment value for finely adjusting the amplitude of the feeding rate, a cycle fine-adjustment value for finely adjusting the cycle of the feeding rate, and a forward/reverse ratio fine-adjustment value for finely adjusting the ratio between the forward feeding period and the reverse feeding period of the feeding rate,
wherein the sensitivity is determined so that:
the sensitivity decreases as the amplitude fine-adjustment value increases and the sensitivity increases as the amplitude fine-adjustment value decreases;
the sensitivity decreases as the cycle fine-adjustment value increases and the sensitivity increases as the cycle fine-adjustment value decreases; and
the sensitivity decreases as the forward/reverse ratio fine-adjustment value increases and the sensitivity increases as the forward/reverse ratio fine-adjustment value decreases.

2. An arc welding control method comprising:
cyclically alternating a forward feeding period and a reverse feeding period as to a feeding rate of a welding wire, to generate short-circuiting periods and arc periods;
performing shifting to the arc period by reducing a welding current, in response to a detection of a constriction of a droplet formed on the welding wire during the short-circuiting period,
performing automatic setting control of sensitivity of the detection of constriction, based on a construction detection time, representing a time period from a time point where the constriction is detected during the short-circuiting period to a time point where the shifting to the arc period is performed, and
changing a gain for the automatic setting control according to a waveform parameter of the feeding rate,
wherein the waveform parameter of feeding rate is at least one or more of an amplitude, a cycle and a forward/reverse ratio, which is a ratio between the forward feeding period and the reverse feeding period of a waveform of the feeding rate,
wherein the feeding rate of the welding wire is controlled by controlling a feeding motor based on a control signal generated by adjusting a predetermined average feeding-rate setting signal with an amplitude fine-adjustment value for finely adjusting the amplitude of the feeding rate, a cycle fine-adjustment value for finely adjusting the cycle of the feeding rate, and a forward/reverse ratio fine-adjustment value for finely adjusting the ratio between the forward feeding period and the reverse feeding period of the feeding rate,
wherein the gain is determined so that:
the gain decreases as the amplitude fine-adjustment value increases and the gain increases as the amplitude fine-adjustment value decreases;
the gain decreases as the cycle fine-adjustment value increases and the gain increases as the cycle fine-adjustment value decreases; and
the gain decreases as the forward/reverse ratio fine-adjustment value increases and the gain increases as the forward/reverse ratio fine-adjustment value decreases,
wherein, in the automatic setting control, the gain is used to amplify a difference between the constriction detection time and a predetermined constriction detection-time setting value, to determine the sensitivity of the detection of constriction based on the amplified difference so that the constriction detection time becomes equal to the predetermined constriction detection-time setting value.

3. The arc welding control method according to claim 2, wherein the amplified difference is accumulated, and the accumulated amplified difference is added to a predetermined initial value to determine the sensitivity of the detection of constriction.

4. The arc welding control method according to claim 2, wherein the gain is obtained based on the predetermined average feeding-rate setting value, the amplitude fine-adjustment value, the cycle fine-adjustment value and the forward/reverse ratio fine-adjustment value.

5. The arc welding control method according to claim 4, wherein, an amplitude standard value, a cycle standard value and a forward/reverse ratio standard value are preset in correspondence to the average feeding-rate setting signal, the gain is obtained by calculating $Gs+a2 \cdot Wfr+b2 \cdot Tfr+c2 \cdot Dfr$, where Gs being a gain standard value which is obtained based on the average feeding-rate setting signal, Wfr being the amplitude fine-adjustment value, which indicates a difference between an amplitude of the control signal and the amplitude standard value, Tfr being the cycle fine-adjustment value, which indicates a difference between a cycle of the control signal and the cycle standard value, Dfr being the forward/reverse ratio fine-adjustment value, which indicates a difference between a forward/reverse ratio of the control signal and the forward/reverse ratio standard value, and each of a2, b2 and c2 being a constant value of negative real-number.

6. The arc welding control method according to claim 1, wherein the sensitivity is determined based on the predetermined average feeding-rate setting value, the amplitude fine-adjustment value, the cycle fine-adjustment value and the forward/reverse ratio fine-adjustment value.

7. The arc welding control method according to claim 6, wherein an amplitude standard value, a cycle standard value and a forward/reverse ratio standard value are preset in correspondence to the average feeding-rate setting signal, the constriction detection-sensitivity standard value is obtained by calculating $Nts+a1 \cdot Wfr+b1 \cdot Tfr+c1 \cdot Dfr$, where Nts being a constriction detection-sensitivity standard value which is obtained based on the average feeding-rate setting signal, Wfr being the amplitude fine-adjustment value, which indicates a difference between an amplitude of the control signal and the amplitude standard value, Tfr being the cycle fine-adjustment value, which indicates a difference between a cycle of the control signal and the cycle standard value, Dfr being the forward/reverse ratio fine-adjustment value, which indicates a difference between a forward/reverse ratio of the control signal and the forward/reverse ratio standard value, and each of a1, b1 and c1 being a constant value of negative real-number, and the constriction detection-sensitivity standard value corresponds to the voltage threshold.

\* \* \* \* \*